United States Patent [19]

Simons et al.

[11] Patent Number: 4,636,642
[45] Date of Patent: Jan. 13, 1987

[54] THIN THERMOLUMINESCENT DOSIMETER AND METHOD OF MAKING SAME

[75] Inventors: Gale G. Simons, Manhattan, Kans.; Timothy M. DeBey, Albuquerque, N. Mex.

[73] Assignee: Kansas State University Research Foundation, Manhattan, Kans.

[21] Appl. No.: 579,388

[22] Filed: Feb. 13, 1984

[51] Int. Cl.$^4$ ............................................. G01T 1/11
[52] U.S. Cl. .................................. 250/337; 250/484.1
[58] Field of Search ............................ 250/337, 484.1

[56] References Cited

U.S. PATENT DOCUMENTS

| Re. 28,340 | 2/1975 | Stewart et al. | |
|---|---|---|---|
| 3,320,180 | 5/1967 | Swinehart . | |
| 3,532,777 | 10/1970 | Stewart et al. | |
| 3,809,901 | 5/1974 | Szalanczy et al. | 250/337 |
| 3,877,122 | 4/1975 | Wilson | 29/25.35 |
| 3,894,238 | 7/1975 | Cox et al. | 250/484.1 |
| 4,039,834 | 8/1977 | Lucas et al. | 250/337 |
| 4,414,080 | 11/1983 | Williams et al. | 204/129 |

OTHER PUBLICATIONS

"Webster's Third New International Dictionary of the English Language: Unabridged", Merriam Co., Springfield, Mass., 1961, p. 2061.
M. Marshall and J. Dooherty, "Measurement of Skin Dose from Low Energy Beta and Gamma Radiation Using Thermoluminescent Discs", Phys. Med. Biol., vol. 16, No. 3, pp. 503-510, 1971.
D. Lowe, J. R. A. Lakey and B. J. Tymons, "A New Development in Skin Dosimetry", Nuclear Instruments and Methods 169, pp. 609-612, 1980.
Crystal & Electronic Products Dept. Data Sheet 103—High Sensitivity Lithium Fluoride Thermoluminescent Dosimiters, Harshaw Chemical Co., 8/69.
Harvey et al., "Thin-Layer Thermoluminescent Dosimeters Based on High-Temperature Self-Adhesive Tape", Phys. Med. Biol. 24 (6), 1979, pp. 1250-1257.
Yamomoto et al., "Construction of a Composite Thin—Element TLD Using an Optical-Heating Method", Health Physics, vol. 43, No. 3, pp. 383-390, 1982.
Thermoluminescence Dosimetry by A. F. McKinlay, Adam Hilger Ltd. pp. 51-58, 1981.
Thermoluminescence Dosimetry, supra, p. 91.
A. Koczynski and M. Wolska-Witer, "Graphite-Mixed Non-Transparent LiF and $Li_2B_4O_7$.Mn TL Dosimeters Combined With A Two Side Reading System for Beta-Gamma Dosimetry", Central Laboratory for Radiological Protection, Warsaw, Poland.
T. F. Gesell, "A Personnel Beta Dosimetry Method for Reducing Energy Dependence", IDO-12090 (1979).
Simons et al., "Application of Beta Spectroscopy to Beta Dosimetry Research", International Sym. on Beta Dosimetry, Wash. D.C., Feb. 15-17, 1983.

Primary Examiner—Carolyn E. Fields
Attorney, Agent, or Firm—Schmidt, Johnson, Hovey & Williams

[57] ABSTRACT

An improved thermoluminescent ionizing radiation dosimeter of solid, extremely thin construction for more accurate low energy beta dosimetry is provided, along with a method of fabricating the dosimeter. In preferred forms, the dosimeter is a composite including a backing support (which may be tissue equivalent) and a self-sustaining body of solid thermoluminescent material such as LiF having a thickness of less than about 0.25 millimeters and a volume of at least about 0.0125 mm$^3$. In preferred fabrication procedures, an initially thick (e.g., 0.89 millimeters) TLD body is wet sanded using 600 grit or less sandpaper to a thickness of less than about 0.25 millimeters, followed by adhesively attaching the sanded body to an appropriate backing. The sanding procedure permits routine production of extremely thin (about 0.05 millimeters) TLD bodies, and moreover serves to significantly reduce non-radiation-induced thermoluminescence. The composite dosimeters are rugged in use and can be subjected to annealing temperatures for increased accuracy.

26 Claims, 1 Drawing Figure

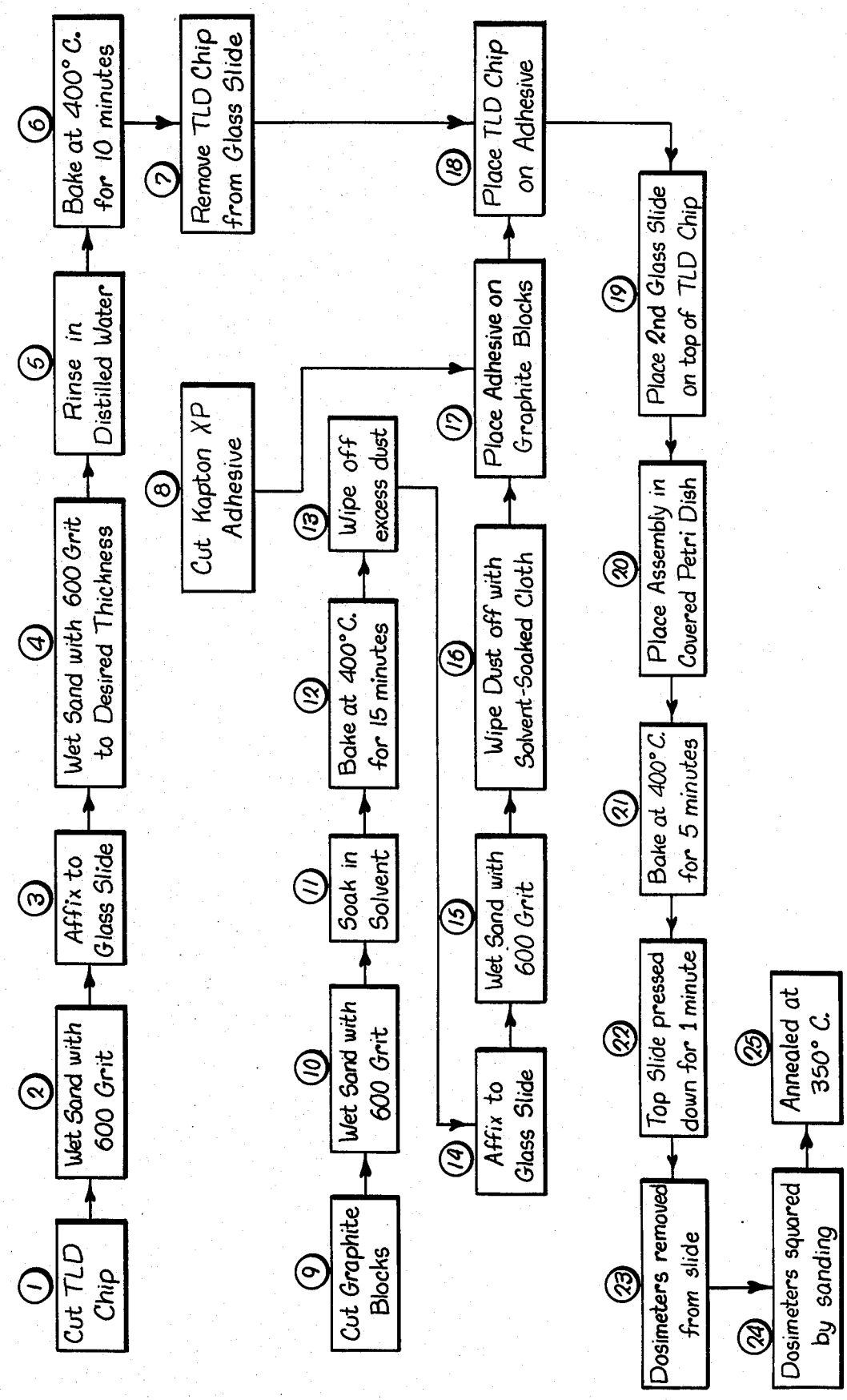

THIN THERMOLUMINESCENT DOSIMETER AND METHOD OF MAKING SAME

The United States government has rights in this invention pursuant to Contract No. B-B4347-A-X supported by the U.S. Department of Energy.

BACKGROUND OF THE INVENTION

1. Field of the Invention

The present invention is concerned with ionizing radiation dosimeters preferably including extremely thin, solid, self-sustaining thermoluminescent material bodies as a part thereof, along with a corresponding method of manufacturing the dosimeters. More particularly, it is concerned with such a dosimeter having a TLD chip or the like which is extremely thin (less than about 0.25 millimeters) and which is produced by a novel technique of sanding initially thick TLD bodies, the sanding procedure also serving to drastically reduce initial nonradiation-induced thermoluminescence exhibited by the body. Indeed, the present invention discloses the first solid, substantially pure TLD material having the requisite thinness for highly accurate beta dosimetry.

2. Description of the Prior Art

Ionizing radiation is routinely measured by exposing a thermoluminescent dosimeter to the radiation and thereafter measuring the light output of the dosimeter when it is heated. Various thermoluminescent (TL) materials are known, the preferred ones being crystalline ionic salts of the alkali metal and alkaline earth metals, with the most common example being lithium fluoride. Radiation dosimetry using crystalline dosimeters is the most widely utilized method for monitoring the radiation to which persons, in an ambience of potentially injurious radiation, have been exposed over a known time interval, ranging from a few minutes to several weeks.

Typically, persons likely to be exposed to radiation carry a dosimeter fixedly mounted in a support such as a card which is subsequently read by being positioned for heat conductive contact with a heated element in a light-tight chamber. The heated dosimeter luminesces and, with the aid of a photo-multiplier tube, generates a reading indicative of the absorbed dose to which the dosimeter and the person carrying it have been subjected. It will be apparent that where a large number of persons are susceptible to radiation in their working environment, the absorbed dose to which each has been subjected must be monitored relatively frequently, and hence the use of radiation dosimeters in this context is of extreme importance.

Personnel dosimeters have been suggested in the past in order to meet the need for convenience, accuracy and ease of reading. Generally speaking, such personnel dosimeters include a wafer, ribbon, rod or chip of thermoluminescent material mounted with an appropriate support and encased within a convenient clip-on card or badge. Advantageously, the support for the thermoluminescent body is approximately tissue equivalent with respect to ambient radiation, so that personnel dosimetry results are as accurate as possible.

Another class of thermoluminescent dosimeters utilizes a high temperature resistant support material, such as a metal, to measure radiation in high intensity fields, often also at elevated temperatures.

Various types of TLD bodies have also been proposed for use in composite dosimeters of the type described above. For example, single crystals of thermoluminescent material have been used, but these display a very non-uniform distribution of thermoluminescent sensitivities. Accordingly, it has been found that by grinding up many such crystals and thoroughly mixing the resultant powder, a reasonably uniform thermoluminescent sensitivity can be achieved. Because powder acts essentially like a fluid, it adopts the shape of the holder in which it is placed, thus providing a degree of flexibility in the choice of dosimeter size and shape.

Another form of conventional thermoluminescent body comprises a ribbon or rod of thermoluminescent material formed by extrusion and/or hot pressing of an initial powder. In the case of extruded bodies, the fused polycrystalline material is extruded through an appropriately shaped die, cut and polished. A variety of sizes and shapes are available in connection with extruded and hot pressed thermoluminescent bodies, but the currently most popular ones are $3 \times 3 \times 0.9$ millimeter chips and $1 \times 1 \times 6$ millimeter micro-rods.

So-called PTFE-based dosimeters are available, which are produced by compressing and heating a homogeneous mixture of fine-grain phosphor powder (such as LiF, typically 10 micrometers in diameter) and PTFE powder to a temperature above the softening temperature of PTFE (327° C.) in a mold. By this means, it is possible to form an intimate matrix of phosphor and PTFE. By varying the loading fraction of the phosphor powder the sensitivity of the dosimeter can be changed. PTFE-based dosimeters are available with different phosphors and in a variety of geometries. Discs are available with diameters of 2-13 millimeters and thicknesses of 0.02-0.50 millimeters. Micro-rods have also been produced in various lengths and one millimeter diameter. PTFE-based dosimeters cannot be annealed in bulk at temperatures greater than 300° C., and moreover, because of the PTFE filler, have higher minimum detectable radiation doses as compared with solid thermoluminescent bodies of the same thickness. Accordingly, PTFE-based dosimeters have not achieved the degree of popularity of solid body thermoluminescent dosimeters.

A type of composite thin-element TLD is described in "Construction Of A Composite Thin-Element TLD Using An Optical-Heating Method", *Health Physics*, Vol. 43, No. 3, pp. 383-390, September 1982, by O. Yamamoto et al. This paper describes a dosimeter made up of a mono-layer of phosphor granules of about 0.09 millimeters diameter formed on a substrate polyimide film of 11 mg/cm$^2$ thick polyimide monomers as a binder. A thin carbon layer is coated onto the opposite side of the polyimide film to increase the absorbency for irradiation. A transparent Teflon FEP film 22 mg/cm$^2$ thick covers the phosphor layer with a gap of 0.5 millimeters to keep out dust, moisture, sweat and the like. As can be appreciated from the foregoing, the dosimeter described by Yamamoto et al. is in the form of a plurality of extremely minute powder-like particles of either lithium borate or calcium sulfate supported on an adhesive light-tight substrate.

Other references describing various types of dosimeters include: U.S. Pat. Nos. 3,320,180, Re. 28,340, 3,809,901, 3,894,238 and 4,039,834, and *Thermoluminescence Dosimetry* by A. F. McKinlay, Adam Hilger Ltd., pp. 51-58, 1981.

Most present day commercially available personnel dosimeters, particularly those employing solid body thermoluminescent material, are deficient in that they underestimate, to a greater or lesser degree, absorbed dosages of low energy beta radiation when calibrated according to American National Standard N13.11 (1982). The reason for this deficiency is that the thermoluminescent materials employed are too thick, typically by an order of magnitude or more. In order to be accurate, the active thermoluminescent body must be thin enough so that its thickness is less than the range of nearly all of the beta emitters of interest. If this condition is not met, then the active dosimeter volume changes with variations in the energies of the beta particles striking the dosimeter. Since many conventional beta dosimeters are calibrated with high energy particles or gamma rays, the calibration inherently assumes the entire dosimeter volume is actively absorbing the radiation energy. Again, this will not be a valid assumption if the dosimeter thickness exceeds the beta range, and it may result in a very severe under estimation of the beta dose. Thus, a thin layer dosimeter is required in order to achieve the desired energy response.

The problem of providing a thin thermoluminescent body for use in a personnel or other dosimeter has presented a significant problem to prior researchers. For example, as noted in *Thermoluminescence Dosimetry*, supra, p. 91, "thin, robust skin dosemeters are particularly difficult to produce." In addition, the following references deal with beta dosimetry and the problem of providing thin thermoluminescent materials so as to achieve an appropriate low beta energy response: A. Koczynski and M. Wolska-Witer, "Graphite-Mixed Non-Transparent LiF and $Li_2B_4O_7$:Mn TL Dosimeters Combined With A Two Side Reading System For Beta-Gamma Dosimetry" Central Laboratory for Radiological Protection, Warsaw, Poland; T. F. Gesell, "A Personnel Beta Dosimetry Method for Reducing Energy Dependence", IDO-12090 (1979); M. Marshall and J. Dooherty, "Measurement of Skin Dose from Low Energy Beta and Gamma Radiation Using Thermoluminescent Discs", *Phys. Med. Biol.,* Vol. 16, No. 3, pp. 503–510, 1971; and D. Lowe, J. R. A. Lakey and B. J. Tymons, "A New Development in Skin Dosimetry", *Nuclear Instruments and Methods* 169, pp. 609–612, 1980.

The recognized need for accurate beta dosimetry has led to the promulgation of industry standards which are virtually impossible to meet using conventional thick dosimeters. That is to say, standards have been set which in effect require extremely thin TLD's, but prior to the present invention commercial production of substantially pure, solid, self-sustaining thin TLD's has not been achieved.

In view of the foregoing, there is a decided and heretofore unresolved need in the art for a radiation dosimeter including an extremely thin, solid, essentially pure crystalline thermoluminescent body giving more accurate low energy response to all forms of ionizing radiation.

SUMMARY OF THE INVENTION

The present invention largely solves the problems outlined above, and provides the first solid thermoluminescent body having the requisite thinness for accurate wide energy dosimetry. In addition, the invention provides a novel method of preparing composite radiation dosimeters which is susceptible of commercial utilization.

Broadly speaking, the radiation dosimeters of the invention comprise a substantially pure, self-sustaining body of thermoluminescent material having a thickness of less than about 0.25 millimeters. Moreover, the volume of the dosimeters should be at least about 0.0125 $mm^3$, although it will be appreciated that if the thickness dimension approaches the upper end of the above range, then the volume dimension will be correspondingly larger. Preferably, the TL body has length and width dimensions of at least about 0.5 millimeters respectively, and more preferably at least about 3 millimeters respectively. Moreover, the thickness of the body is advantageously less than about 0.15 millimeters, and most preferably less than about 0.05 millimeters. The volume is also preferably at least about 0.5 $mm^3$, up to about 2.5 $mm^3$.

The thermoluminescent material is preferably crystalline ionic salt of the alkali metal and alkaline earth metals. The TL material is moreover preferably in the form of a pressed or extruded initially powder crystalline composite which is commercially available.

The overall dosimeters also typically include a backing support for the thermoluminescent material, and in the case of personnel dosimeters, such backing support is preferably approximately tissue equivalent. Materials useful in this context include graphite and appropriate TL materials. In other cases where tissue equivalence is not required (as in the case of ambient or clinical absorbed dose measurements and radiation damage and heating measurements), various metals or other high temperature resistant backing materials may be used to good effect.

The method of fabricating a radiation dosimeter in accordance with the invention broadly comprises the step of providing a self-sustaining body of thermoluminescent material, which is preferably although not necessarily pure, followed by physically abrading at least one surface of the body in order to reduce the thickness thereof to less than about 0.25 millimeters. An optional step involves attaching the abraded body to a backing support of the type described above.

The physical abrasion step comprises sanding at least one, and preferably both, faces of the initially provided body of thermoluminescent material, using fine (such as 600 grit or less) wet sandpaper for this purpose. The sanding is preferably unidirectional, and is carried out until the desired thinness is achieved, as set forth above. Attachment of the sanded TL material to the backing support, if employed, is typically carried out using a high temperature adhesive of known characteristics.

The dosimeters of the present invention give improved beta energy response, particularly at low energy levels. In addition, the dosimeters hereof would be expected to give improved gamma and X-ray energy response and are believed to have improved neutron response and neutron/gamma ray sensitivity. Very importantly, the dosimeters of the invention also exhibit substantially reduced non-radiation induced thermoluminesence, so that their sensitivity to ionizing radiation is further enhanced. Finally, the dosimeters can be used with existing read-out instruments, can be annealed at high annealing temperatures, and are rugged in use.

BRIEF DESCRIPTION OF THE DRAWING

The single FIGURE is a schematic flow representation of the preferred method of producing a thin TLD body according to the invention.

DESCRIPTION OF THE PREFERRED EMBODIMENTS

The following example sets forth the presently preferred method of fabricating dosimeters in accordance with the invention. The dosimeters hereof include a thermoluminescent material which is preferably a crystalline ionic salt of the alkali metal and alkaline earth metals, such as those selected from $^{nat}$Lif, $^7$LiF, $^6$LiF, $Li_2B_4O_7$, $CaSO_4$, $CaF_2$, $MgB_4O_7$, doped species of the foregoing, and mixtures thereof.

EXAMPLE I

The following discussion is made with reference to the accompanying FIGURE, wherein the respective steps in the preferred method are identified by reference numerals and those steps are correspondingly referenced by parenthetical expressions throughout the following description. In preparing the thin TLD body, commercially available TLD chips were (step 1) obtained measuring ⅛-inch × ⅛-inch (length and width) and about 0.89 millimeter (approximately 0.035 thousandths of an inch) in thickness. Exemplary materials of this type include 100% lithium fluoride TLD's sold by the Harshaw/Filtrol Partnership, formerly Harshaw Chemical Company of Solon, Ohio under the designations TLD-100, TLD-600 and TLD-700. These products are described in Harshaw Chemical Company data sheet 102, entitled "High Sensitivity Lithium Fluoride Thermoluminescent Dosimeters", and this data sheet is hereby incorporated by reference herein. The specific LiF material employed in this example had a density of 2.64 g/cm$^3$.

Both faces of the Harshaw TLD's were initially sanded (step 2) with 600 grit or finer sandpaper to smooth the faces; advantageously, the sandpaper is wetted with a small amount of distilled water to facilitate the initial light sanding.

Next, a sufficient number of Kapton XP adhesive squares (approximately 3.2 millimeter on each side) were cut (step 8) to make the desired number of final dosimeters. The Kapton XP product is described in detail hereinafter.

Graphite was selected as the backing member for the dosimeters, and accordingly graphite was cut into small blocks (step 9) (approximately 3.8 × 3.8 millimeters square with a thickness of about 0.89 millimeters). Both faces of the graphite blocks were smoothed by light sanding (step 10) with 600 grit sandpaper, followed by soaking (step 11) in acetone or alcohol to clean the blocks. The sanded graphite blocks were then baked (step 12) in a 400° C. oven for about 15 minutes, and any remaining dust was then wiped from the blocks (step 13).

About 10 of the initially sanded, thick TLD chips were next glued (step 3) to a glass slide with cyanoacrylate glue (i.e., "Super Glue"). A small space was provided between all TLD ribbons, and the chips were each pushed down hard to ensure a good, flat mounting.

The glass slide with chips secured thereto was then placed in its holder, and the chips were set sanded (step 4) until they were approximately 0.05 millimeters thick. This was measured with a micrometer by comparing the slide plus TLD thickness with the bare slide thickness. Sanding was accomplished by fixing a 600 grit or finer piece of sandpaper on a flat surface and wetting the paper with distilled water. The chip-bearing slide and holder was next moved unidirectionally (as opposed to back-and-forth sanding) over the sandpaper to sand the respective chips. Some of the TLD chips were fractured in the sanding process, but this can be minimized by careful sanding. The chip-bearing slide was next removed from its holder, rinsed (step 5) with distilled water, and allowed to dry. The slide was then placed in a 400° C. oven for 10 minutes (step 6). This vaporized the cyanoacrylate glue and freed the TLD chips from the slide. The wafers were extremely fragile in this state and were handled (step 7) by sliding them from one position to another using tweezers or the like. The wafer thickness may be calculated by weighing the wafer on a microbalance and computing the thickness from the known density and size dimensions; in the alternative, a thickness determination can be made by measuring the radiation sensitivity of the sanded chips (after backing thereof) against known thickness standards.

The appropriate number of graphite blocks were next glued to a glass slide (step 14) in the same manner as set forth with respect to the TLD chips. This slide was placed in a holder, and the graphite blocks were wet sanded lightly (step 15) (Using 600 grit wet sandpaper) to ensure that all blocks are the same thickness. Dust was wiped (step 16) from the blocks with an acetone or alcohol dampened cloth. A Kapton XP square was placed on top of each graphite block, (step 17) followed by a thin sanded TLD chip on top of each Kapton XP square (step 18). Another glass slide was carefully placed on top of these composites, (step 19) and the entire assembly was put in a covered petri dish (step 20) and placed in a 400° C. oven for 5 minutes (step 21). After removal from the oven, the top glass slide was immediately pressed down hard and held for one minute (step 22) to compress the composite dosimeters. The dosimeters were then removed (step 23) from the slide and were squared by sanding to about ⅛" by ⅛". While these dosimeters are quite rugged, care should be taken not to get carbon dust on the TL chips from stacking, sliding in and out of envelopes, etc., since this will reduce the desirable characteristics of the dosimeters.

In the final dosimeters, the thin TLD chips provided the radiation dose information, while the graphite backings were nearly tissue equivalent and supported the fragile chips. The dosimeters could be annealed at 350° C. by virtue of the Kapton XP adhesive employed.

The Kapton XP adhesive product is manufactured and sold by the E. I. duPont de Nemours and Co., Inc. of Wilmington, Del. and is in the form of a thin polyimide film based on pyromellitic dianhydride and 4,4,diaminodiphenyl ether. The molecular formula of Kapton is $(C_{22}H_{10}O_5N_2)_n$. This film was developed primarily as an electrical insulator in high temperature environments such as for motor and generator windings. The Kapton XP film has a coating of Teflon PFA (a copolymer of tetrafluoroethylene with a fully fluorinated alkoxy side chain) on one or both sides to act as a high temperature adhesive and allow heat sealing of the Kapton to many materials.

The Kapton XP used in this example to make the TLD composites was a 0.025 millimeters thick Kapton layer with a 0.013 millimeter layer of Teflon PFA adhesive on each side. This product is described in a manufacturer's new product information bulletin entitled "Kapton Type XP New Product Information", E-42732; and additional information is contained in publications referenced in the foregoing. All of these publications are incorporated by reference herein.

Since Kapton XP film was used to make composite dosimeters which would potentially be exposed to a high temperature annealing environment for extended periods of time, its stability at high temperatures was of great interest. Experiments indicated that the Kapton XP could withstand 400° C. temperature for approximately 10 hours with no observable changes. Beyond 10 hours at 400° C., the Kapton XP began to discolor to the point of being a dark bronze color after approximately 20 hours. Continued exposure to 400° C. beyond this caused gradual peeling and buckling of the film until, after approximately 50 hours, the film was reduced to a small piece of "ash." During the buckling and peeling of the Kapton XP film, the thin TLD chip would usually be broken. The gradual darkening of the film did not produce any observable change in the radiation dose response of the thin TLD layer. It is believed that the black graphite backing of the dosimeter made its response insensitive to the color of the Kapton XP film.

Annealing experiments showed that the composite dosimeters can be annealed at 350° C. in covered petri dishes for 10 minutes to remove residual thermoluminescence from previous radiation exposure. This is in contrast with the 400° C. anneal required for thick (0.89 millimeter) dosimeters.

Other composite dosimeters in accordance with the invention can be produced using the methods outlined above. For example, use can be made of a wide variety of other TLD materials such as $CaF_2$:Mn, $CaF_2$:Dy as opposed to the TLD materials described above. In addition, the backing support can be formed from a large number of materials, including a thick (0.89 millimeter) LiF TLD chip, various metals or other high temperature resistant materials. In all cases, however, the thin TLD component is obtained using the sanding techniques of the invention.

Actual test results demonstrate that the physical abrading (sanding) of the TLD chips substantially reduces non-radiation-induced thermoluminescence, which is important in obtaining the most accurate low absorbed doses. In order to obtain this lessening, it is not necessary to sand the TLD material to the preferred thinness, and in fact only a light sanding suffices. Therefore, the sanding step may prove beneficial even in the case of conventional thick TLD's, but should be sufficient to significantly reduce non-radiation induced thermoluminescence, as compared with an otherwise identical, unabraded or unsanded body. Advantageously, the reduction in non-radiation induced thermoluminescence attributable to sanding should be at least about a factor of two.

The test results referred to above demonstrate up to about a factor of 5 reduction in non-radiation-induced thermoluminescence, to the point that the dosimeters of the invention exhibit virtually no non-radiation-induced TL. In addition, tests to date indicate that the reduction in non-radiation-induced thermoluminescence is substantially long lived, and may be permanent. While the reason for this phenomenon is not completely understood, it is hypothesized that the sanding removes monomolecular surface layers of the TLD material, and with these absorbed hydroxyl ions on the material surface. Such hydroxyl ions are believed to contribute to non-radiation-induced thermoluminescence.

EXAMPLE II

Energy response experiments were performed using two different energy beta sources to determine the response of conventional thick and thin LiF TLD's (the latter being in accordance with the present invention). Dosimeters were covered with 1.4 mg/cm$^2$ of Mylar polyester film and calibrated using recommended procedures with $^{90}$Y beta particles (maximum energy of 2.274 MeV). Based upon these calibration results, the radiation dose from a $^{204}$Tl beta source (maximum energy of 0.763 MeV) was found to be underestimated by factors of 3.93 and 1.17 with the thick (0.89 mm) and thin (0.072 mm average thickness) TLD's respectively. Therefore an improvement of a factor of 3.3 (or 330%) was achieved in the accuracy by employing the thin TLD's of the invention. These results and additional data for thin TLD's, exposed without a covering material, are shown in Table I.

TABLE I

Measured factor for how much a LiF TLD exposed to maximum beta energies of 0.763 MeV from Tl-204 would undesestimate the beta dose relative to 2.27 MeV betas from a Y-90 source.

| TLD Cover THICKNESS (MG/CM$^2$) | Average TLD THICKNESS (MG/CM$^2$) | | | |
|---|---|---|---|---|
| | 235$^a$ | 19.3 ± 3$^b$ | 18.9 ± 5$^c$ | 13.1 ± $^c$ |
| 0 | — | 1.09 | 1.13 | 1.04 |
| 1.4 | 3.93 | — | 1.17 | — |

$^a$Commercial LiF ⅛ × ⅛ × 0.035-inch.
$^b$Thin $^7$LiF with a graphite backing.
$^c$Thin $^{nat}$LiF with a graphite backing.

We claim:

1. A radiation dosimeter comprising an essentially pure, self-sustaining, solid body of thermoluminescent material of substantially constant density and having a thickness of less than about 0.15 millimeters and a volume of at least about 0.0125 mm$^3$.

2. The dosimeter of claim 1, said body having length and width dimensions of at least about 0.5 millimeters respectively.

3. The dosimeter of claim 2, said length and width dimensions being at least about 3 millimeters.

4. The dosimeter of claim 1, said thickness being less than about 0.05 millimeters.

5. The dosimeter of claim 1, said body presenting at least one sanded face.

6. The dosimeter of claim 1, said body presenting a pair of opposed sanded faces.

7. The dosimeter of claim 1, including a block for said body, and means for securing said body to said block.

8. The dosimeter of claim 1, said material being selected from the group consisting of $^{nat}$LiF, $^7$LiF, $^6$LiF, $Li_2B_4O_7$, $CaSO_4$, $CaF_2$, $MgB_4O_7$, doped species of the foregoing, and mixtures thereof.

9. The dosimeter of claim 1, said body having a volume of at least about 0.5 mm$^3$.

10. The dosimeter of claim 9, said volume being from about 0.0125 to 2.5 mm$^3$.

11. The dosimeter of claim 1, said body being in the form of a pressed or extruded initially powder material.

12. A method of fabricating a radiation dosimeter comprising the steps of:

providing a solid, self-sustaining body of thermoluminescent material having a substantially constant density; and physically abrading at least one surface of said body in order to reduce the thickness thereof to less than about 0.15 millimeters.

13. The method of claim 12, said abrading step comprising sanding at least one face of said body.

14. The method of claim 12, said abrading step comprising sanding a pair of opposed faces of said body.

15. The method of claim 12, said thickness being less than about 0.05 millimeters.

16. The method of claim 12, said body being selected from the group consisting of $^{nat}$LiF, $^7$LiF, $^6$LiF, $Li_2B_4O_7$, $CaSO_4$, $CaF_2$, $MgB_4O_7$, doped species of the foregoing, and mixtures thereof.

17. The method of claim 12, said body, after said abrading step, having a volume of at least about 0.0125 mm$^3$.

18. The method of claim 12, said body, after said abrading step, having length and width dimensions of at least about 0.5 millimeters respectively.

19. The method of claim 12, including the step of attaching said abraded body to a block.

20. The method of claim 19, said attaching step comprising adhesively securing said abraded body to said block.

21. The method of claim 19, said block being approximately tissue equivalent material.

22. The method of claim 19, said block being non-tissue equivalent.

23. The method of claim 12, said body being substantially pure thermoluminescent material.

24. A radiation dosimeter produced by the method which comprises the steps of:

providing a solid, self-sustaining body of thermoluminescent material having a substantially constant density; and physically abrading at least one surface of said body in order to reduce the thickness thereof to less than about 0.15 millimeters.

25. A method of treating a solid thermoluminescent body comprising a crystalline ionic salt of the alkali metal and alkaline earth metals, said method comprising the step of physically abrading a surface of said body to an extent that the body exhibits at least about a factor of two reduction in non-radiation induced thermoluminescence, as compared with an otherwise identical, unabraded body.

26. The method of claim 23, said abrading step comprising sanding said surface of said body.

* * * * *